United States Patent
Larmo et al.

(10) Patent No.: US 9,253,633 B2
(45) Date of Patent: Feb. 2, 2016

(54) METHOD AND MOBILE DEVICE FOR GENERATING A DATA AUTHENTICATION KEY

(71) Applicant: TELEFONAKTIEBOLAGET L M ERICSSON (PUBL), Stockholm (SE)

(72) Inventors: Anna Larmo, Espoo (FI); Ari Keranen, Kirkkonummi (FI); Daoyuan Li, Espoo (FI); Riikka Susitaival, Helsinki (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 15 days.

(21) Appl. No.: 13/724,169

(22) Filed: Dec. 21, 2012

(65) Prior Publication Data

US 2014/0181926 A1 Jun. 26, 2014

(30) Foreign Application Priority Data

Dec. 20, 2012 (WO) ................. PCT/EP2012/076452

(51) Int. Cl.
*H04L 9/32* (2006.01)
*G06F 21/30* (2013.01)
*H04L 29/06* (2006.01)
(Continued)

(52) U.S. Cl.
CPC .............. *H04W 12/04* (2013.01); *G06F 21/30* (2013.01); *H04L 9/0813* (2013.01); *H04L 9/0844* (2013.01); *H04L 9/32* (2013.01); *H04L 9/3273* (2013.01); *H04L 63/0823* (2013.01)

(58) Field of Classification Search
CPC . H04L 9/3273; H04L 63/0823; H04L 9/0813; H04L 9/0844; H04L 9/32; G06F 21/30
USPC ............................................................. 726/6
See application file for complete search history.

(56) References Cited

U.S. PATENT DOCUMENTS 7,925,022 B2 * 4/2011 Jung et al. .................... 380/270
2007/0287424 A1 * 12/2007 Park ............................. 455/411
(Continued)

FOREIGN PATENT DOCUMENTS

| GB | 2447674 A | * | 9/2008 |
| WO | 2010078094 A1 | | 7/2010 |
| WO | WO 2012135677 A1 | * | 10/2012 |

OTHER PUBLICATIONS

International Search Report and Written opinion from corresponding application PCT/EP2012/076452, mailed on Jun. 3, 2013, 7 pages.

*Primary Examiner* — Dede Zecher
*Assistant Examiner* — Jason C Chiang
(74) *Attorney, Agent, or Firm* — Rothwell, Figg, Ernst & Manbeck, P.C.

(57) ABSTRACT

The invention relates to a method for generating a data authentication key for allowing data communication over a wireless channel between a first mobile device and a second mobile device, comprising: associating said mobile devices to each other by means of said key. The invention comprises: allowing a shared physical or mechanical condition to be applied generally simultaneously upon said devices; detecting, in said first mobile device, said condition; defining, in said first mobile device, said authentication key based on the detected condition; and transmitting said key to said second mobile device. The invention also relates to a mobile device configured for generating a data authentication key for allowing data communication over a wireless channel to a further mobile device.

17 Claims, 2 Drawing Sheets

(51) Int. Cl.
*H04L 9/08* (2006.01)
*H04W 12/04* (2009.01)

(56) References Cited

U.S. PATENT DOCUMENTS

| | | | |
|---|---|---|---|
| 2008/0019514 A1* | 1/2008 | Stromberg et al. | 380/46 |
| 2009/0292920 A1* | 11/2009 | Willey | 713/169 |
| 2010/0161966 A1* | 6/2010 | Kwon et al. | 713/155 |
| 2010/0167646 A1* | 7/2010 | Alameh et al. | 455/41.2 |
| 2010/0306538 A1* | 12/2010 | Thomas et al. | 713/168 |
| 2011/0004436 A1* | 1/2011 | Beute | 702/141 |
| 2011/0093712 A1* | 4/2011 | Jin et al. | 713/171 |
| 2012/0054493 A1* | 3/2012 | Bradley | 713/171 |
| 2012/0255875 A1* | 10/2012 | Vicente et al. | 205/782 |
| 2014/0006784 A1* | 1/2014 | Walker et al. | 713/169 |
| 2014/0096179 A1* | 4/2014 | Ben-Shalom et al. | 726/1 |

* cited by examiner

METHOD AND MOBILE DEVICE FOR GENERATING A DATA AUTHENTICATION KEY

CROSS-REFERENCE TO RELATED APPLICATION(S)

This application claims priority to International Patent Application No. PCT/EP2012/076452, filed Dec. 20, 2012, which is incorporated by reference in its entirety.

TECHNICAL FIELD

The present invention relates to a method for generating a data authentication key for allowing data communication over a wireless channel between a first mobile device and a second mobile device, comprising associating said mobile devices to each other by means of said key.

The invention also relates to a mobile device which is configured for generating a data authentication key for allowing data communication over a wireless channel to a further mobile device.

BACKGROUND ART

In the field of wireless communication, there is often a requirement for connecting, i.e. "pairing", two or more mobile devices to each other in a secure manner. In order to establish a secure wireless communication link between mobile devices, it is common to use differerent types of authentication methods in order to verify that only authorized units are allowed to establish a communication link with each other.

An example of a scenario in which there is a requirement for such an authentication method is when a sensor unit—for example an infrared sensor which is to be used as an intruder alarm—communicates with a data collecting unit. In such case, it is necessary for the data collecting unit to be authorized to receive data from the sensor unit. This can be solved, for example, by allowing a user to enter an authentication code on the sensor unit and the data collecting unit for pairing these device with each other. There are many other types of situations in which there is a requirement of providing a secure authentication for data communication between wireless devices.

Even though it is previously known to use authentication codes as such for pairing two or more devices in a device-to-device communication network, as described above, there is further need for improved methods for such authentication.

In particular, there is a need for such methods and devices which are easy to understand and use for a user and which has a high level of security.

SUMMARY OF THE INVENTION

The object of the invention is to provide an improved method and device for generating a data authentication key in a situation involving data communication between mobile devices.

In order to solve said object, the present invention provides a method for generating a data authentication key for allowing data communication over a wireless channel between a first mobile device and a second mobile device, comprising a step of associating said mobile devices to each other by means of said key. The invention further comprises: allowing a shared physical or mechanical condition to be applied generally simultaneously upon said devices; detecting, in said first mobile device, said condition; defining, in said first mobile device, said authentication key based on the detected condition; and transmitting said key to said second mobile device.

By means of the invention, there is provided a convenient and highly secure way of pairing two or more mobile devices by generating a data authentication code. By means of the invention, there is no need for any passwords or PIN codes in order to connect the mobile devices to each other. Instead, the authentication process is carried out suitably by a user applying a shared physical or mechanical condition onto the mobile devices.

According to an embodiment, the method comprises: detecting, in said second mobile device, said condition; defining, in said second mobile device, a further key based on said detected said condition; and transmitting said further key to said first mobile device.

According to such an embodiment, two authentication codes are used, one code which is sent from the first mobile device to the second mobile devices, and one which is sent from the second mobile device to the first mobile devices. This means that codes are generated for both mobile devices in order to authorize secure data communication in both directions between the mobile devices.

According to an embodiment, the method comprises detecting said condition in the form of a pattern of movement based on an output signal from an accelerometer. In this manner, a robust and relatively low-cost component such as a conventional accelerometer can be used. A user would have to ensure that the mobile devices are subjected to a pattern of movement, i.e. a certain sequence of motion, in order to define an authentication key. Such a pattern of movement can be a movement up and down or sideways of the mobile devices, or generally any pattern of motion which can be detected by means of an accelerometer.

According to a further embodiment, the method comprises detecting said condition in the form of knocking, tapping or similar on the mobile devices based on an output signal from a microphone.

Furthermore, the invention relates to a mobile device configured for generating a data authentication key for allowing data communication over a wireless channel to a further mobile device. The mobile device comprises a detector unit arranged for detecting a shared physical or mechanical condition being applied generally simultaneously upon said devices; a key generating unit configured for defining said key based on an output from said detector unit; and a communication unit for transmitting said key to said further mobile device.

According to an embodiment, the detector unit is constituted by an accelerometer. Alternatively, the detector can be a microphone or a gyro sensor or a similar type of sensor.

BRIEF DESCRIPTION OF THE DRAWINGS

The invention will be described more fully hereinafter with reference to the accompanying drawings, wherein.

DETAILED DESCRIPTION OF EMBODIMENTS

Figure 1:
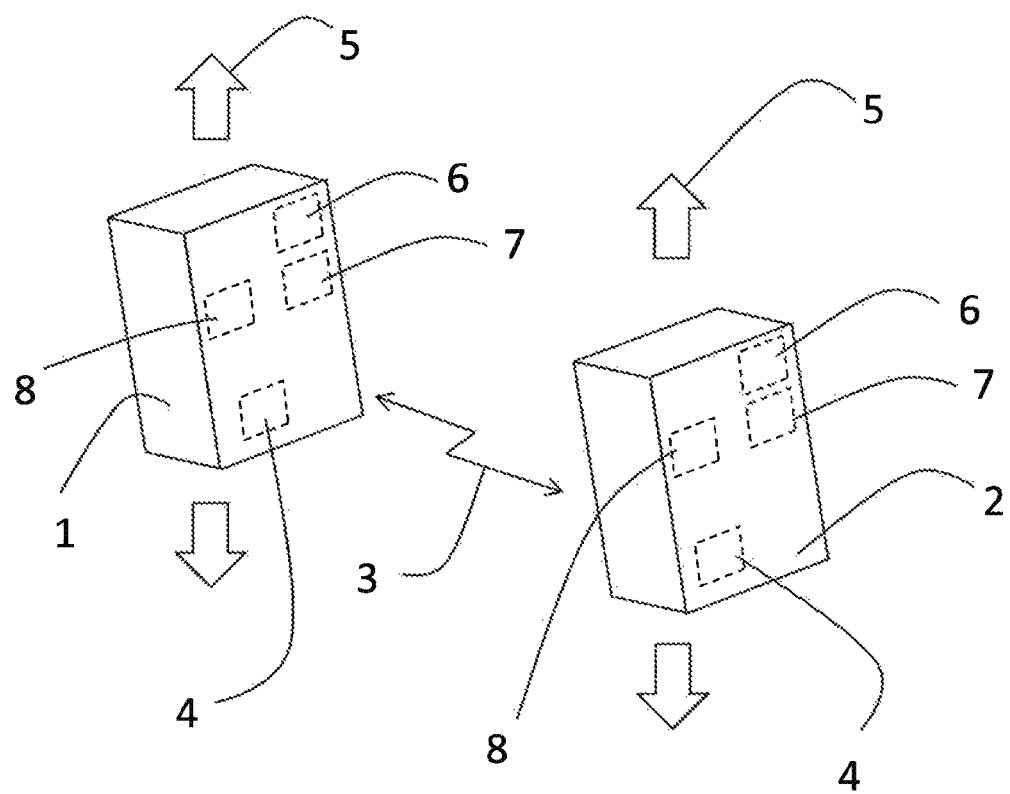
FIG. 1 is a simplified perspective view of two mobile devices being configured in accordance with the present invention.

FIG. 1 shows a simplified perspective view of a first mobile device 1 and a second mobile device 2. Purely as an example, and according to an embodiment, the first mobile device 1 is a sensor for detecting a physical parameter such as temperature. Also as an example, the second mobile device 2 is a sensor gateway in which information regarding temperature, as measured and transmitted by the first mobile device 1, is collected.

The first mobile device 1 and the second mobile device 2 are configured for wirelessly communicating with each other by establishing a wireless communication link 3. According to an embodiment, this is carried out by means of a Bluetooth connection. Such a connection is established by allowing the first mobile device 1 to find the second mobile device 2 by allowing the first mobile device 1 to transmit inquiry signals to the second mobile device 2 and also to allow the first mobile device 1 to detect inquiry response signals from the second mobile device 2 in order to establish a communication link between the mobile devices 1, 2. Such a Bluetooth procedure is as such previously known and for this reason, it is not described in further detail.

According to alternative embodiments, the step of establishing a wireless connection between the first mobile device 1 and the second mobile device 2 can be carried out for example with Zigbee-based technology or by means of a Wi-Fi communication network.

The first mobile device 1, for example being a temperature sensor, is configured for transmitting data related to the surrounding temperature to the second mobile device 2 which operates as a sensor gateway for collecting said data related to temperature. The second mobile device 2 is furthermore arranged for transmitting said temperature data to a remote server by means of a further wireless link (not shown) which according to an embodiment is based on Wi-Fi or cellular network technologies.

It should be mentioned that according to further embodiments, the mobile devices can be other types of units which are associated with each other. For example, the first mobile device 1 can be a sensor for virtually any physical, chemical or environmental parameter and condition which cooperates with a second mobile device 2 which is a gateway or node arranged for receiving and treating data from the first mobile device 1.

According to a further embodiment, the first mobile device can be in the form of a mobile telephone, a tablet computer, a laptop, a digital camera or a similar handheld and wireless device. In such case, the first mobile device communicates with a second mobile device which can be in the form of a storage unit for data files, such as audio, video or photo files. In this manner, data files can be transmitted wirelessly from the first mobile device to the second device.

According to yet a further embodiment, the first mobile device is a mobile telephone which communicates with a second mobile device in the form of a headset. These mobile devices obviously should be paired in order to operate in a correct manner.

According to a further embodiment, the first mobile device is a wireless router for a wireless data communication network. In such case, the second mobile device can be a further wireless device such as database server operating within the wireless network.

Generally, it is noted that the first and second mobile devices are in the form of units which interact through a data communication link and in which there is a requirement for securely associating the first and second mobile device with each other, i.e. for "pairing" these mobile device. This means that in order to allow a communication link to be established between the first mobile device and the second mobile device, there must first be an authentication process initiated in order to secure that only the correct units communicate with each other.

According to an embodiment, and with reference to FIG. 1, the first mobile device 1 and the second mobile device 2 are configured for generating said data authentication key. The purpose of this data authentication key is to control data communication over the wireless channel from the first mobile device 1 to the second mobile device 2, and vice versa. This is in order to prevent unauthorized access to the data signals being transmitted between the mobile devices 1, 2. To this end, each of the first mobile device 1 and the second mobile device 2 comprises a detector unit 4 which is configured for detecting a shared physical or mechanical condition of the mobile devices 1, 2, i.e. a condition which is shared, i.e. common, for both mobile devices 1, 2.

According to a first embodiment, such a shared physical or mechanical condition is in the form of a pattern of movement 5 of the two mobile devices 1, 2 which occurs generally simultaneously. In order to capture this shared condition, the detector unit 4 is according to the embodiment in the form of an accelerometer. This means that if the two mobile devices 1, 2 are being subjected to a pattern of movement 5 generally simultaneously, for example if a user moves the mobile devices 1, 2 together up and down a few times, or if the user shakes them together back and forth, such a pattern of movement 5 can be detected by means of the accelerometers 4 in each of the mobile devices 1, 2.

More precisely, the accelerometers 4 are arranged to capture a sequence of acceleration values in those dimensions where the accelerometer 4 measures acceleration. According to an embodiment, the accelerometer is a three-axis type, which means that acceleration values in the x, y and z dimensions are measured and captured simultaneously for both accelerometers 4.

Furthermore, according to another embodiment, the shared physical or mechanical condition can be an influence in the form of tapping or knocking upon each mobile device 1, 2, generally at the same time, and with the same sequence or pattern on both mobile devices 1, 2. Alternatively, the shared physical or mechanical condition can be that the mobile devices 1, 2 are exposed to certain sounds, for example clapping hands or whistling, which are detected by both mobile devices 1, 2 simultaneously. These examples of sounds or vibrations being applied to the mobile devices 1, 2 by a user can be picked up and registered in an embodiment in which the detector unit 4 is constituted by a microphone.

According to a further embodiment, the detector unit is in the form of a gyro sensor, which is a type of detector which is sensitive to rotational movement and which can be used to sense a change in orientation. Such a sensor type can also be used to detect a shared physical or mechanical condition acting on the mobile devices.

According to the above-mentioned embodiment, the shared physical or mechanical condition is constituted by a state in which there is applied a pattern of movement or motion 4 upon the two mobile devices 1, 2. This pattern is used in a key generating unit 6, which forms part of both the first and second mobile device 1, 2. The key generating unit 6 recognizes a sampled sequence of data from the accelerometer 4 and defines an authentication key based on the characteristics of the accelerometer data. For example, values corresponding to a certain number of data samples can be selected as an authorization code, or values representing the measurement values from said accelerometer 4 in some other suitable manner.

Furthermore, the first mobile device 1 comprises a communication unit 7 which is configured for transmitting said key to the other said further mobile device 2, and vice versa. The key transmitted from the first mobile device 1 to the second mobile device 2 can be referred to as Key1, whereas the key transmitted from the second mobile device 2 to the first mobile device 1 can be referred to as Key2.

During actual use of the first mobile device 1—i.e. according to an embodiment as a sensor—the authentication code of the first mobile device 1 is stored in the second mobile device 2 (and also in the first mobile device 1). This means that the second mobile device 2 only has access to measurement data from the first mobile device 1 if it has the authentication key (Key1) as described above. In a typical scenario, the first mobile device 1 first transmits a key request message in which it is expected that the second mobile device 2 responds by stating the correct key, i.e. Key1 in this case. If the correct key is not provided, the measurement data from the first mobile device 1 will not be transmitted.

Figure 2:
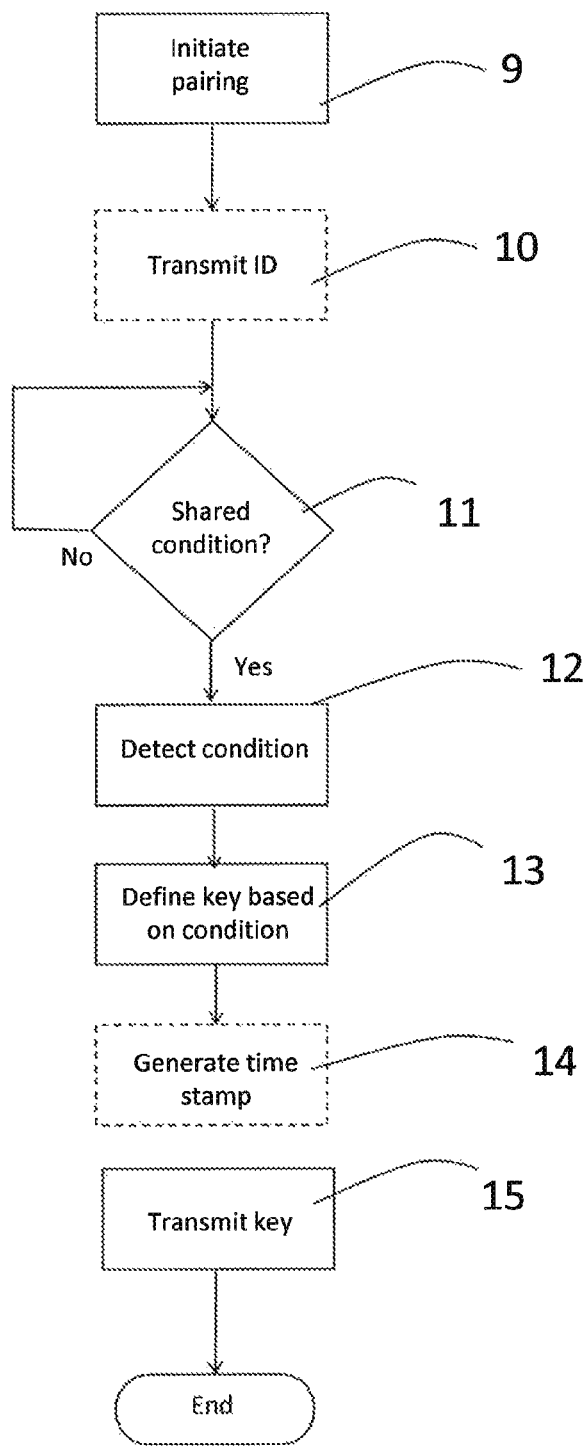
FIG. 2 is a flow chart describing the operation of the invention.

According to an embodiment, each one of the first mobile device 1 and the second mobile device 2 comprises a user input unit 8 which is arranged for initiating a "pairing" sequence in which a data authentication key will be generated. A process for generating such a data authentication key will now be described with reference to an embodiment and FIG. 2. A first step is to initiate such a pairing step (step 9). This can be done by using the user input unit 8 on each one of the mobile devices 1, 2. According to other embodiments, the pairing can be initiated in other ways, for example by tapping on an icon on a display (not shown) on the mobile devices.

According to an embodiment including an optional step, information regarding the identities of the mobile devices 1, 2 is exchanged (step 10), i.e. a first identification code representing the first mobile device 1 is transmitted to the second mobile device 2 and a second identification code representing the second mobile device 2 is transmitted to the first mobile device 1.

Next, it is detected whether a physical or mechanical condition which is shared by the mobile devices 1, 2 is applied by the mobile devices 1, 2 (step 11). This corresponds for example to a situation in which a user shakes the mobile devices simultaneously, for example by holding both mobile devices 1, 2 in one hand and shaking them together or by moving them together in accordance with any suitable movement pattern which the user chooses.

According to the embodiment, the mobile devices 1, 2 comprise a detector unit in the form of an accelerometer which then operate so as to detect the shared physical or mechanical condition which the mobile devices 1, 2 are subjected to (step 12). This is suitably carried of by sampling acceleration values in all the dimensions that the accelerometer operates Next, an authentication code, or key, is generated in the key generating unit 6 in each mobile device 1, 2 (step 13). This key is formed from measurement values from the accelerometer which correspond to a certain number of data samples or which represent the measurement values in a suitable manner.

According to an embodiment including an optional step, there is detected and stored a time stamp (step 14), i.e. timing information related to the measurement values from the accelerometers and the time sequence of the physical or mechanical condition being applied to the mobile devices.

Next, the authentication key which is formed in the first mobile device 1, referred to as "Key1", is transmitted to the second mobile device 2 and is stored therein (step 15). Simultaneously, the authentication key which is formed in the second mobile device 2, referred to as "Key2", is transmitted to the first mobile device 1 and is stored therein. This ends the process of generating an data authentication key.

The invention is not limited to the embodiments described above, but is defined by the appended claims. For example, the number of mobile devices is not limited to two, but the invention can be used in situations when three or more mobile devices communicate with each other.

The invention claimed is:

1. A method in a system comprising a first mobile device and a second mobile device, comprising:
   detecting, in said first mobile device, a physical or mechanical condition;
   defining, by said first mobile device, an authentication code based on the detected condition;
   transmitting, from said first mobile device, said defined authentication code to said second mobile device;
   receiving at said second mobile device said authentication code defined by said first mobile device;
   storing in a memory of the second mobile device said received authentication code defined by said first mobile device;
   transmitting, from said first mobile device to said second mobile device, an authentication request message;
   receiving, at the second mobile device, the transmitted authentication request message;
   in response to receiving the authentication request message, the second mobile device a) retrieving from said memory said received authentication code transmitted by said first mobile device and b) transmitting to the first mobile device an authentication response message comprising said retrieved authentication code;
   the first mobile device receiving the authentication response message transmitted by the second mobile device; and
   in response to receiving the authentication response message, the first mobile device authenticating the second mobile device using the authentication code defined by the first mobile device and the authentication code included in the authentication response message transmitted by the second mobile device, wherein authenticating the second mobile device comprises comparing the authentication code defined by the first mobile device with the authentication code included in the authentication response message.

2. The method according to claim 1, further comprising:
   detecting, in said second mobile device, said physical or mechanical condition;
   defining, in said second mobile device, a second other authentication code based on said condition detected in said second mobile device; and
   transmitting, from said second mobile device, said second authentication code to said first mobile device.

3. The method according to claim 1, wherein:
   the condition comprises movement of the first mobile device, and the step of detecting said condition comprises receiving an output signal from an accelerometer.

4. The method according to claim 1, wherein:
   the condition comprises a noise, and
   the step of detecting said condition comprises using a microphone to detect said noise.

5. The method according to claim 1, further comprising:
   registering a time stamp associated with said physical or mechanical condition.

6. The method according to claim 1, further comprising:
   transmitting, from said first mobile device, information defining the identity of said first mobile device to said second device; and transmitting, from said second mobile device, information defining the identity of said second mobile device to said first device.

7. The method according to claim 1, wherein access to measurement data in the first mobile device, by the second mobile device, is based on the second mobile device having the authentication code.

8. The method of claim 1, wherein the first mobile device and the second mobile device are paired to each other.

9. The method of claim 8, wherein the pairing is initiated by using a user input unit on the first mobile device and the second mobile device.

10. The method of claim 8, wherein the pairing is initiated by initiating an icon on a display of the first mobile device and the second mobile device.

11. The method of claim 1, wherein the method further comprises:
   generating, at the first mobile device, measurement data based on an output of a sensor; and
   the first mobile device sending the measurement data to the second mobile device in response to authenticating the second mobile device.

12. The method of claim 11, wherein the sensor is an environmental sensor for sensing the environment in which the first mobile device is located.

13. The method of claim 12, wherein the sensor is located in the first mobile device and comprises one or more of a temperature sensor and a chemical sensor, wherein the temperature sensor senses temperature levels outside a human body.

14. The method of claim 13, wherein the first mobile device generates temperature data based on the temperature levels and transmits the temperature data to the second mobile device, wherein the second mobile device sends the temperature data to a remote server.

15. The method of claim 14, wherein the first mobile device transmits audio, photo, or video files to the second mobile device.

16. The method of claim 13, wherein the physical or mechanical condition is based on tapping or knocking the first mobile device.

17. A system comprising:
a first mobile device comprising a first receiver and a first transmitter; and
a second mobile device comprising a second receiver and a second transmitter, wherein
the first mobile device is configured to: detect a physical or mechanical condition; define an authentication code based on the detected condition; and employ the first transmitter to transmit said defined authentication code to said second mobile device,
the second mobile device is configured such that, in response to receiving the authentication code defined and transmitted by the first mobile device, the second mobile device stores in a memory of the second mobile device said received authentication code,
the first mobile device is further configured to employ the first transmitter to transmit to the second mobile device an authentication request message,
the second mobile device is configured such that, in response to receiving the authentication request message transmitted by the first mobile device, the second mobile device a) retrieves from said memory said received authentication code transmitted by said first mobile device and b) employs the second transmitter to transmit to the first mobile device an authentication response message comprising said retrieved authentication code, and
the first mobile device is configured such that, in response to receiving the authentication response message transmitted by the second mobile device, the first mobile device authenticates the second mobile device using the authentication code defined by the first mobile device and the authentication code included in the authentication response message transmitted by the second mobile device, wherein the first mobile device is configured such that it authenticates the second mobile device by comparing the authentication code defined by the first mobile device with the authentication code included in the authentication response message.

* * * * *

UNITED STATES PATENT AND TRADEMARK OFFICE
CERTIFICATE OF CORRECTION

PATENT NO. : 9,253,633 B2  
APPLICATION NO. : 13/724169  
DATED : February 2, 2016  
INVENTOR(S) : Larmo et al.

It is certified that error appears in the above-identified patent and that said Letters Patent is hereby corrected as shown below:

In the specification

In Column 4, Line 58, delete "motion 4" and insert -- motion 5 --, therefor.

Signed and Sealed this
Twenty-sixth Day of April, 2016

Michelle K. Lee
*Director of the United States Patent and Trademark Office*